United States Patent
Ritz

(10) Patent No.: US 11,062,393 B2
(45) Date of Patent: Jul. 13, 2021

(54) SYSTEMS FOR EVALUATING EXPOSURE TO INSURANCE POLICIES CAUSED BY CATOSTROPHIC EVENTS

(71) Applicant: American International Group, Inc., New York, NY (US)

(72) Inventor: Jonathan Ritz, West Chester, PA (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 669 days.

(21) Appl. No.: 14/456,311

(22) Filed: Aug. 11, 2014

(65) Prior Publication Data

US 2016/0042465 A1    Feb. 11, 2016

(51) Int. Cl.
*G06Q 40/00*    (2012.01)
*G06Q 40/08*    (2012.01)

(52) U.S. Cl.
CPC .............. *G06Q 40/08* (2013.01); *Y02A 10/40* (2018.01)

(58) Field of Classification Search
CPC ....................................................... G06Q 40/08
See application file for complete search history.

(56) References Cited

U.S. PATENT DOCUMENTS

| | | | | |
|---|---|---|---|---|
| 7,359,863 B1* | 4/2008 | Evenshaug | .......... | G06Q 10/087 705/4 |
| 7,693,731 B1* | 4/2010 | Weber | ..................... | G06Q 10/10 705/4 |
| 7,693,766 B2* | 4/2010 | Horowitz | ............... | G06Q 10/04 705/35 |
| 8,055,563 B2* | 11/2011 | Horowitz | ............... | G06Q 10/04 705/35 |
| 8,799,036 B1* | 8/2014 | Christensen | ............. | G07C 5/00 340/438 |
| 2004/0039609 A1* | 2/2004 | Burkitt | ................... | G06Q 40/08 705/4 |
| 2004/0186753 A1 | 9/2004 | Kim et al. | | |
| 2009/0265193 A1* | 10/2009 | Collins | .............. | G06Q 30/0185 705/4 |
| 2010/0205016 A1* | 8/2010 | Chen | ...................... | G06Q 20/10 705/4 |
| 2013/0185100 A1* | 7/2013 | Allu | ....................... | G06Q 40/08 705/4 |
| 2014/0058783 A1* | 2/2014 | Modi | ................. | G06Q 10/0631 705/7.25 |
| 2015/0019264 A1* | 1/2015 | Roll | ....................... | G06Q 40/06 705/4 |

(Continued)

OTHER PUBLICATIONS

D. A. D'Zmura, "Forecasting expectations of insured depository default and catastrophic losses," Proceedings of the IEEE/IAFE/INFORMS 1998 Conference on Computational Intelligence for Financial Engineering (CIFEr) (Cat. No. 98TH8367), New York, NY, USA, 1998, pp. 66-91, doi: 10.1109/CIFER. 1998.690003. (Year: 1998).*

*Primary Examiner* — Rajesh Khattar
(74) *Attorney, Agent, or Firm* — Snell & Wilmer L.L.P.

(57) ABSTRACT

A computing device programmed to receive and use event data, such as hurricane, earthquake, fire, flood, and storm event data, and map that data to computer display map along with insured data related to an insurance portfolio that can also be mapped by geographic area and value, so that a user can quickly determine the exposure to a portfolio from an event. The event can be either a real-time event or a historical event.

12 Claims, 24 Drawing Sheets

(56) References Cited

U.S. PATENT DOCUMENTS

2015/0019265 A1* 1/2015 Roll ..................... G06Q 40/06
 705/4
2015/0073834 A1* 3/2015 Gurenko ............... G06Q 40/08
 705/4
2016/0353252 A1* 12/2016 Krasadakis ............ H04W 4/06

* cited by examiner

1102

1302

1402

1602

SYSTEMS FOR EVALUATING EXPOSURE TO INSURANCE POLICIES CAUSED BY CATOSTROPHIC EVENTS

BACKGROUND OF THE INVENTION

Field of the Invention

The field of the invention is directed towards, inter alia, systems for evaluating the potential exposure to an insurance portfolio in a geographic area by past or current catastrophic insurance events such as hurricanes.

Description of the Related Technology

Insurance companies provide various beneficial products to insure properties in the event of a natural disaster such as homeowner's insurance, commercial property insurance, catastrophic insurance, flood insurance, earthquake insurance, and hurricane insurance, to name a few. Insurance companies further provide products that protect businesses if a catastrophic event causes interruption to or loss of business due to a natural disaster. Insurance companies have a need to be able to dynamically evaluate their exposure risk in the event of a potential natural disaster or catastrophic events such as hurricanes, tornadoes, earthquakes, floods, windstorms and hailstorms, based on the projected or actual geographic area affected by these events. Insurance companies also have a need for an interactive tool to evaluate the exposure risk in a geographic area to insurance policies or portfolios of insurance policies by past historical events.

The risk posed by events to an insured property varies based upon features of the event, including the potential path and intensity or severity of an event. Being able to dynamically evaluate this type of information is valuable for insurers in order to ascertain and evaluate the potential liability to which they may be exposed. Insurance companies have a need for an interactive and dynamic tool to evaluate the exposure in a geographic area based on actual or projected intensity and other variables such as projected effected geographic area.

In order to reduce its risk of large payments to insured persons or entities, insurance companies often purchase reinsurance. The insurance company that purchases reinsurance is typically known as the ceding party and the party selling the reinsurance is aptly referred to as the reinsurer. A typical reinsurance agreement between the ceding party and the reinsurer provides for the ceding party to pay a reinsurance premium to the reinsurer in exchange for the reinsurer promising to pay the ceding party in the event of a claim by the insured. Reinsurance companies generally provide insurance for a variety of ceding parties or insurance companies. Reinsurance companies have a need to dynamically evaluate their reinsurance portfolios or portfolios they may acquire in relation to a geographic region, insurance coverage, and the actual or projected geographic region affected by a catastrophic event, as well as in relation to historical event data to ascertain the potential risk.

SUMMARY OF THE INVENTION

According to one aspect of the invention, an insurance evaluation system for evaluating the exposure to insurance in a geographic area due to a catastrophic event comprises a computer memory for storing insured data comprising an insured value and an insured geographic area associated with the insured value; and first computer processor programmed to acquire event data comprising an event type, event severity, and event geographic area, display the event data in a computer display, acquire the insured data and display the insured data on the computer display for determining whether the insured data is implicated by the event data. The system may further comprise an electrical receiver for receiving the event data in real-time and that is electrically connected to the first computer processor for providing the event data to the first computer processor.

The system may process either historical or real-time event data that is stored in the computer memory. The event data can be stored locally or remotely in a remote computer. The real-time event data can be provided by a service that streams weather data.

According to another aspect of the invention, a mobile station comprises a first computer processor programmed to acquire event data comprising an event type, event severity, and event geographic area, display the event data in a computer display, acquire insured data comprising an insured value and an insured geographic area associated with the insured value and display the insured data on a computer display for determining whether the insured data is implicated by the event data; and a transceiver for interfacing with a system that provides the insured data and a system that provides the event data.

According to another aspect of the invention, an insurance evaluation system for evaluating the exposure to insurance in a geographic area due to a catastrophic event, comprises a first computing system comprising a first computer memory for storing insured data comprising an insured value and an insured geographic area associated with the insured value and a first processor for providing the insured data to a mobile station; a second computing system comprising a second memory for storing event data comprising an event type, severity, and geographic event area, and a second processor for providing the event data to a mobile station; and a mobile station comprising a computer processor programmed with executable instructions for acquiring the event data and the insured data and displaying the event data and the insured data graphically on a computer display.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described embodiments of the invention.

BRIEF DESCRIPTION OF THE DRAWINGS

FIG. 13 is a preferred embodiment of a display showing selection of the alerts.

DETAILED DESCRIPTION OF THE PREFERRED EMBODIMENT(S)

Figure 1:
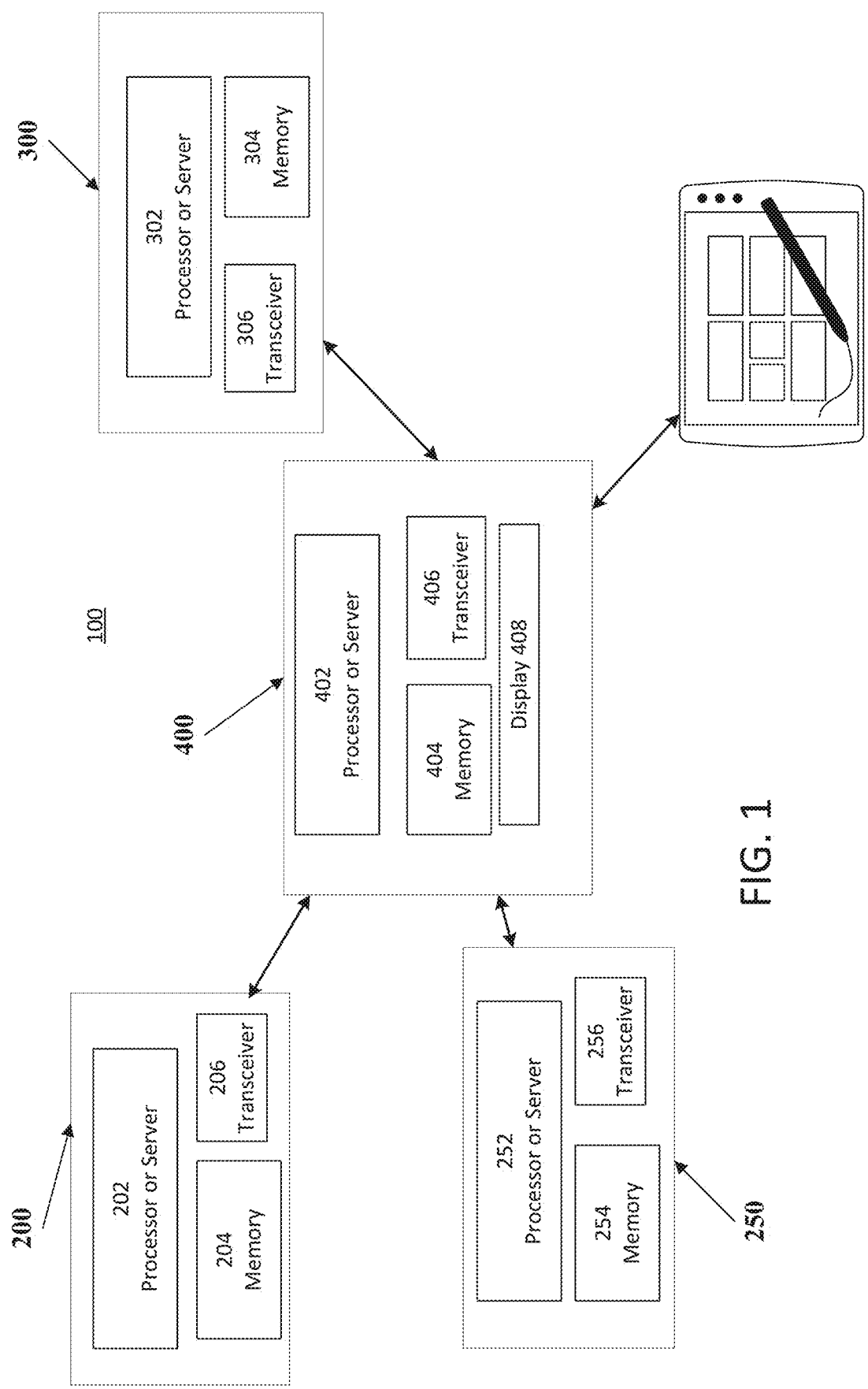
FIG. 1 is a preferred embodiment of a risk evaluation system of this invention.

FIG. 1 depicts an embodiment of a risk evaluator system 100 that comprises a historical event system 200, a real-time event system 250, an insured system 300, and a client system 400. The risk evaluator system 100 is for evaluating the effects of events on an insurance portfolio on a geographic basis. For example, the potential exposure based on a catastrophic event to an insurance portfolio that pertains to a particular geographic region can be assessed. For example, the projected path of a hurricane can be evaluated to determine whether the hurricane path format impacts an insured portfolio and the potential exposure to the portfolio can be determined.

The historical event system 200 preferably comprises a processor or server 202 with memory 204 containing historical data on insurance events, such as fires, earthquakes, hurricanes, floods, typhoons, cyclones, tornadoes, windstorms and hailstorms and the like. These event examples are nonlimiting and provided as examples. The events can be classified based on event type and event severity. For example, a hurricane can be classified as having a severity from 1-5. In addition, the event data contains event geographical data that corresponds to the event location and/or event path. The historical event system 200 also has a transceiver 206 for communicating with other systems, such as the client system 400. The historical event system can communicate with the client system 400 via the internet, cellular connections, satellite connections, or any conventional way of communicating between computers.

The real-time event system 250 preferably comprises a processor or server 252 with memory 254 and streams real-time event data to the client system 400, such as event type, event severity, event geographic location, and event path and projected path. As used herein "real-time" means nonhistorical data and is meant to include the concept of data that is being determined or gathered as an event is happening or about to happen and includes the concept of data related to an-going event, such as a hurricane that may last for hours or days. Since the real-time data relates to an on-going event, the term includes but is not meant to be limited to instantaneous data, but also includes all data related to that ongoing event. The real-time event system 250 also includes a transceiver 256 for communicating with client system 400. The real-time event system can communicate with the client system 400 via the internet, cellular connections, satellite connections, or any conventional way of communicating between computers.

The insured system 300 preferably comprises a processor or server 302, an insured memory 304, and a transceiver 306. The insured memory 304 contains insured data such as insurance portfolios. Preferably, the insured data contains the insurance company, the instrument or portfolio value, and a geographic region for the instrument, portfolio, or instruments within the portfolio. For example, the instruments within a portfolio can be classified by country, state/province, county or local area, zip code, and any other geographic basis. The insured system 300 also includes a transceiver 306 for communicating with client system 400. The insured system 300 can communicate with the client system 400 via the internet, cellular connections, satellite connections, or any conventional way of communicating between computers.

The client system 400 preferably comprises a processor or server 402 programmed with one or more of the algorithms as described herein and memory 404, transceivers 406 for communicating with one or more of the historical data system 200, real-time event data system 250, and insured data system 300, and a display 408. The system memory 404 has one or more of the algorithms described herein for correlating event data with a graphical interface and displaying that data for correlation with insured data on a display 408. The display can be any conventional computer display, such as a monitor, touch screen, or other graphical user interface.

Figure 2:
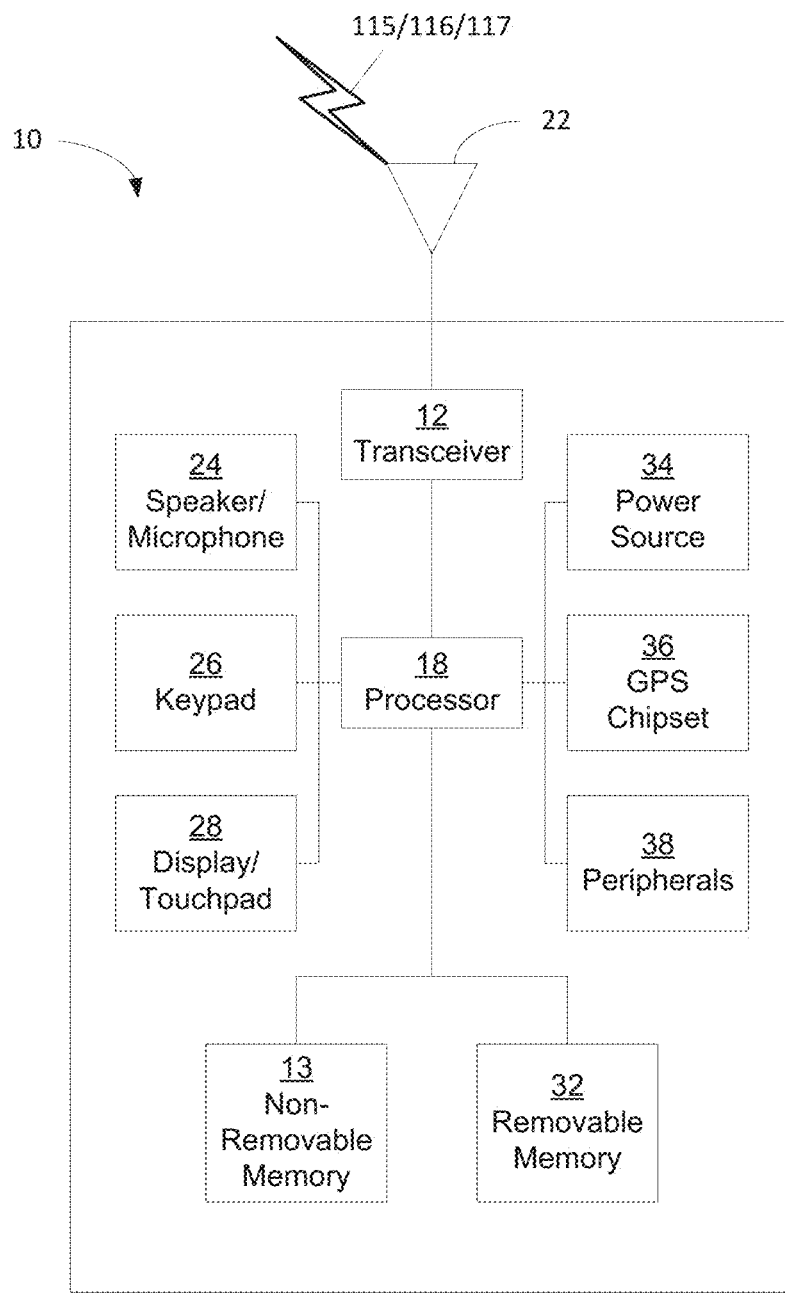
FIG. 2 is an exemplary view of a computing system that can be used with this invention as the historical event data system, real-time event data system, insured system, and/or client system.

FIG. 2 is a diagram of an example computer system 10 in which one or more disclosed embodiments may be implemented. The computer system 10 can be used for each of the historical event system 200, real-time event system 250, insured system 300, and client system 400. The computer system 10 may be a stand alone computer, tablet, laptop, or a mobile computer or station. In a preferred embodiment, the client system 400 is mobile station or an iPad tablet capable of running ios 6.0 or greater, as depicted in FIG. 1. However, it should be understood that the computing systems 10 may be another type of mobile computing device or a stationary computing device.

The computing system 10 useful for any of the historical event system 200, real-time event system 250, insured system 300, and client system 400 has a processor 18, which may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 18 may perform signal coding, data processing, power control, input/output processing, and/or any other functionality that enables the system to operate in a wired or wireless environment. The processor 18 may be coupled to the transceiver 12, which may be coupled to the transmit/receive element 22. While FIG. 2 depicts the processor 18 and the transceiver 12 as separate components, it will be appreciated that the processor 18 and the transceiver 12 may be integrated together in an electronic package or chip.

The processor 18 may be coupled to, and may receive user input data from, an input device such as a speaker/microphone 24, keypad 26, and/or a display/touchpad 28 (e.g., a liquid crystal display (LCD) display unit or organic light-emitting diode (OLED) display unit). The processor 18 may also output user data to the speaker/microphone 24, the keypad 26, and/or the display/touchpad 28. In addition, the processor 18 may access information from, and store data in, any type of suitable memory or data storage disk, for example the non-removable memory 13 and/or the removable memory 32. The non-removable memory 130 may include random-access memory (RAM), read-only memory (ROM), a hard disk, or any other type of memory storage device. The removable memory 32 may include a subscriber identity module (SIM) card, a memory stick, a secure digital (SD) memory card, and the like. In an embodiment, the processor 18 may access information from, and store data in, memory that is not physically located in the computing system, for example on another server or a home computer (not shown).

The processor 18 may receive power from the power source 34, and may be configured to distribute and/or control the power to the other components in the computing system 10. The power source 34 may be any suitable device for powering the computing system. For example, the power source 34 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 18 may also be coupled to a GPS chipset 36, which may be configured to provide location information (e.g., longitude and latitude) regarding the current location of the computer system 10. The GPS chipset is optional. In addition to, or in lieu of, the information from the GPS chipset 36, the computer system 10 may receive location information over the air interface 15/16/17 from a cellular base station and/or determine its location based on the timing of the signals being received from two or more nearby base stations. It will be appreciated that the computer system 10 may acquire location information by way of any suitable location-determination method while remaining consistent with an embodiment.

The processor 118 may further be coupled to other peripherals 38, which may include one or more software and/or hardware modules that provide additional features, functionality and/or wired or wireless connectivity. For example, the peripherals 38 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

In a preferred embodiment of this invention, the client system 400 is a tablet computer or mobile device, and the historical event system 200, the real time event system 250, and insured system 300 are separate remote computing systems. In this embodiment, the client system 400 communicates with the historical event system 200, the real time event system 250, and insured system 300 by any conventional technique including but not limited to internet, cellular systems, satellite systems, and wi-fi systems.

Figure 3:
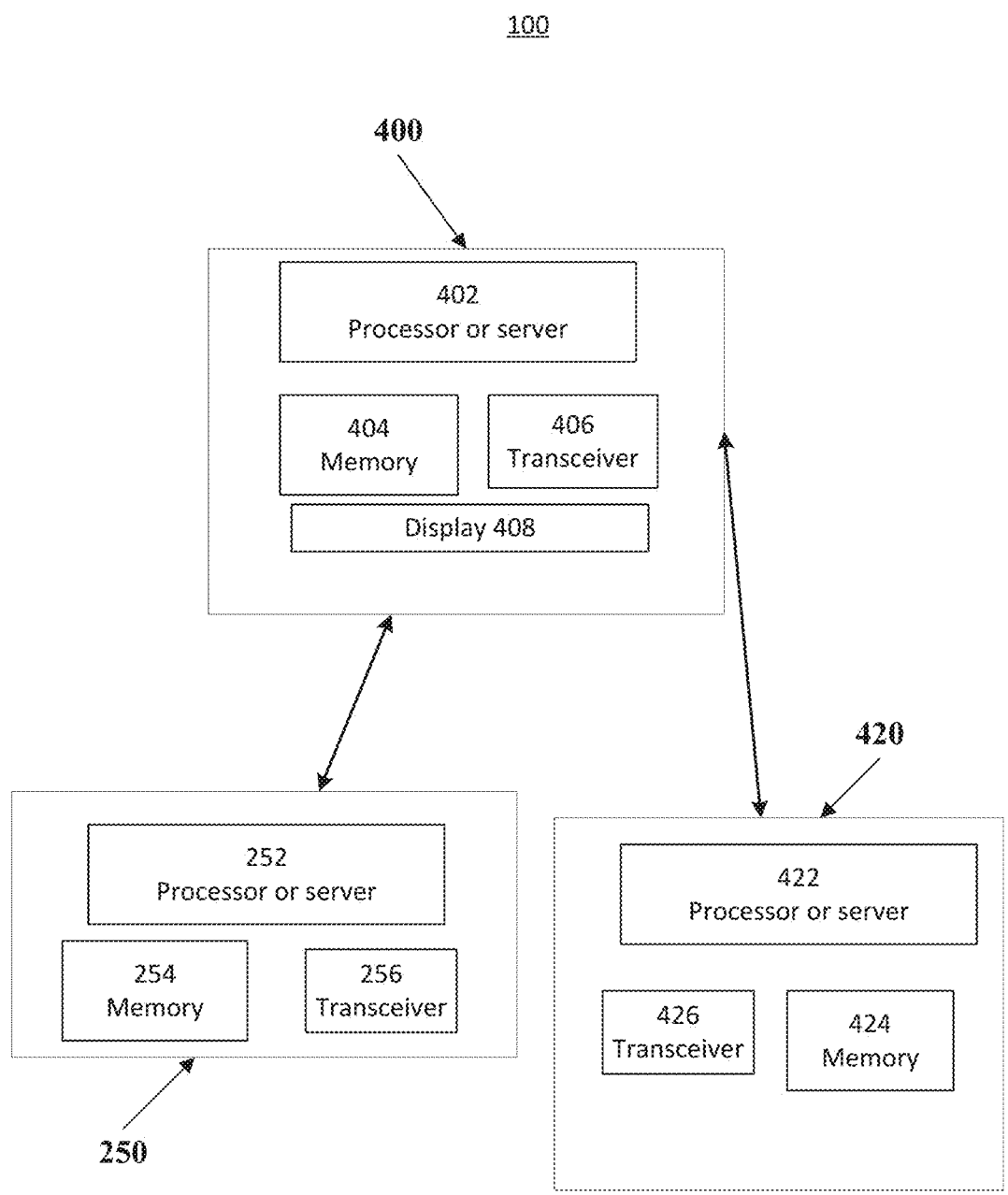
FIG. 3 is a preferred embodiment of a risk evaluation system of this invention.

In other preferred embodiments, the client system 400 and one or more of the historical event system 200, the real time event system 250, and the insured system 300 operate on the same computer or server. For example, as shown in FIG. 3, a computer system 300 having a processor or server 420 having a memory 424 and transceiver 426 (and otherwise as described above with reference to FIG. 2) can store the historical event data and the insured data in its memory 424. The computing systems are otherwise as described herein.

Figure 4:
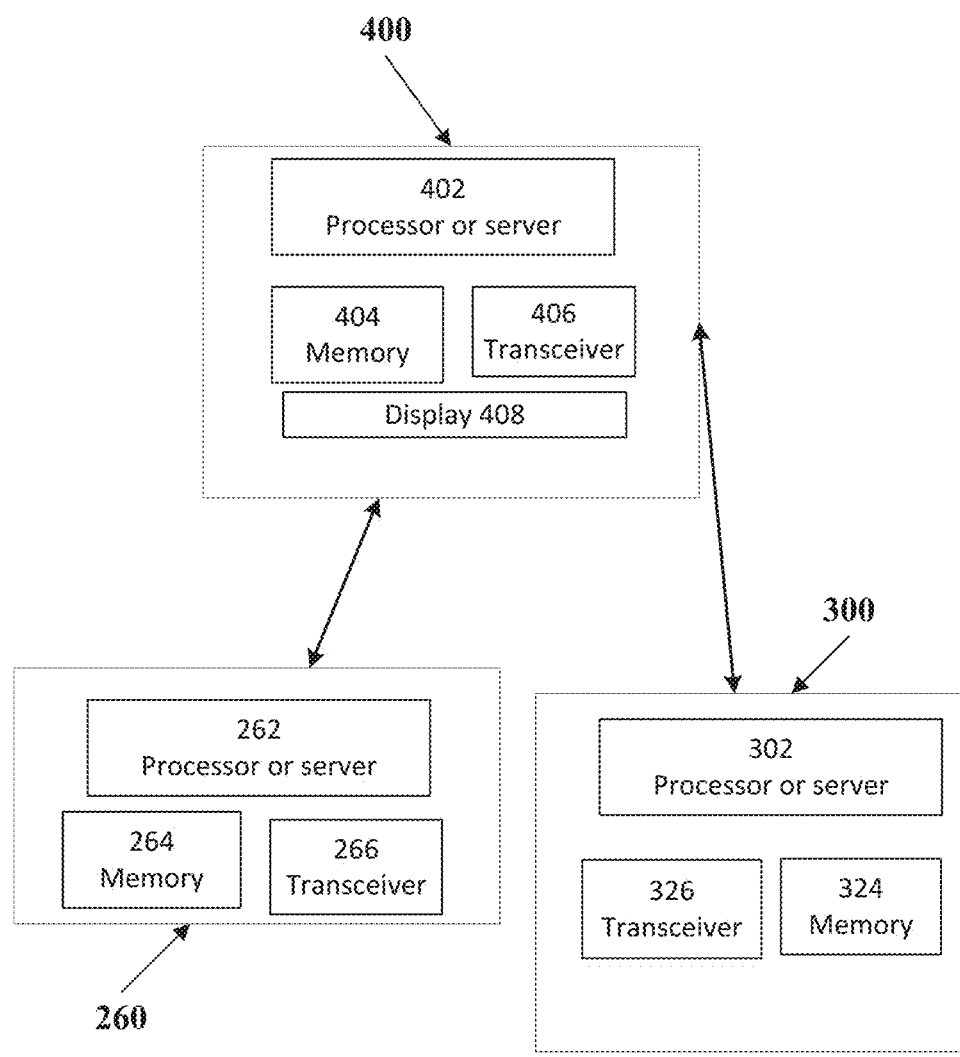
FIG. 4 is a preferred embodiment of a risk evaluation system of this invention.

In other preferred embodiments, as shown in FIG. 4, a computer system 260 having a processor or server 260 having a memory 264 and transceiver 266 (and otherwise as described above with reference to FIG. 2) can store the historical event data and the real-time event data in its memory 264. The computing systems are otherwise as described herein.

Figure 5:
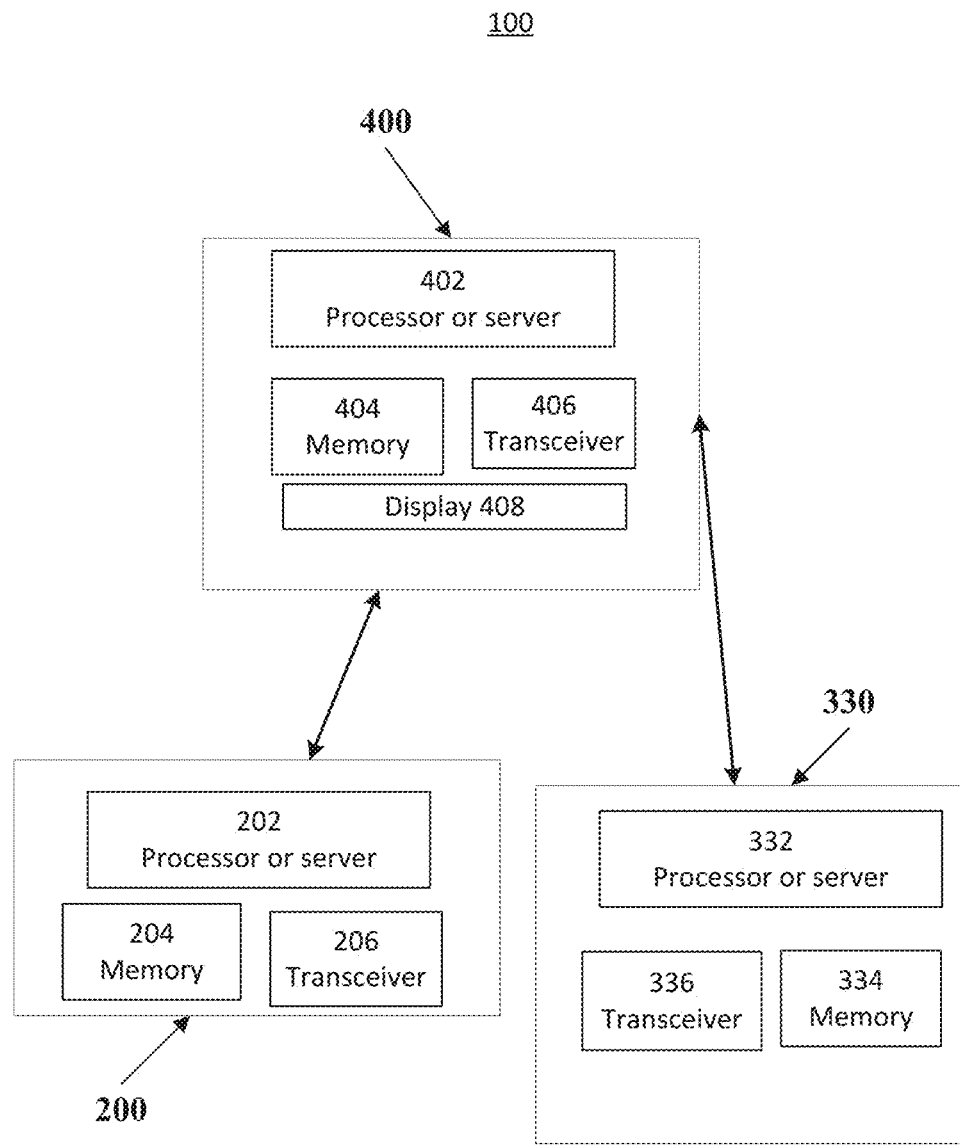
FIG. 5 is a preferred embodiment of a risk evaluation system of this invention.

In other preferred embodiments, as shown in FIG. 5, a computer system 330 having a processor or server 332 having a memory 334 and transceiver 336 (and otherwise as described above with reference to FIG. 2) can store the insured data and the real-time event data in its memory 334. The computing systems are otherwise as described herein.

In other preferred embodiments, one or more of the historical event system 200, real-time data system 250, and insured data system 300 can all be incorporated into the client system 400. Although each combination is not depicted in the figures, it will be appreciated that each combination is within the scope of this invention.

Figure 6:
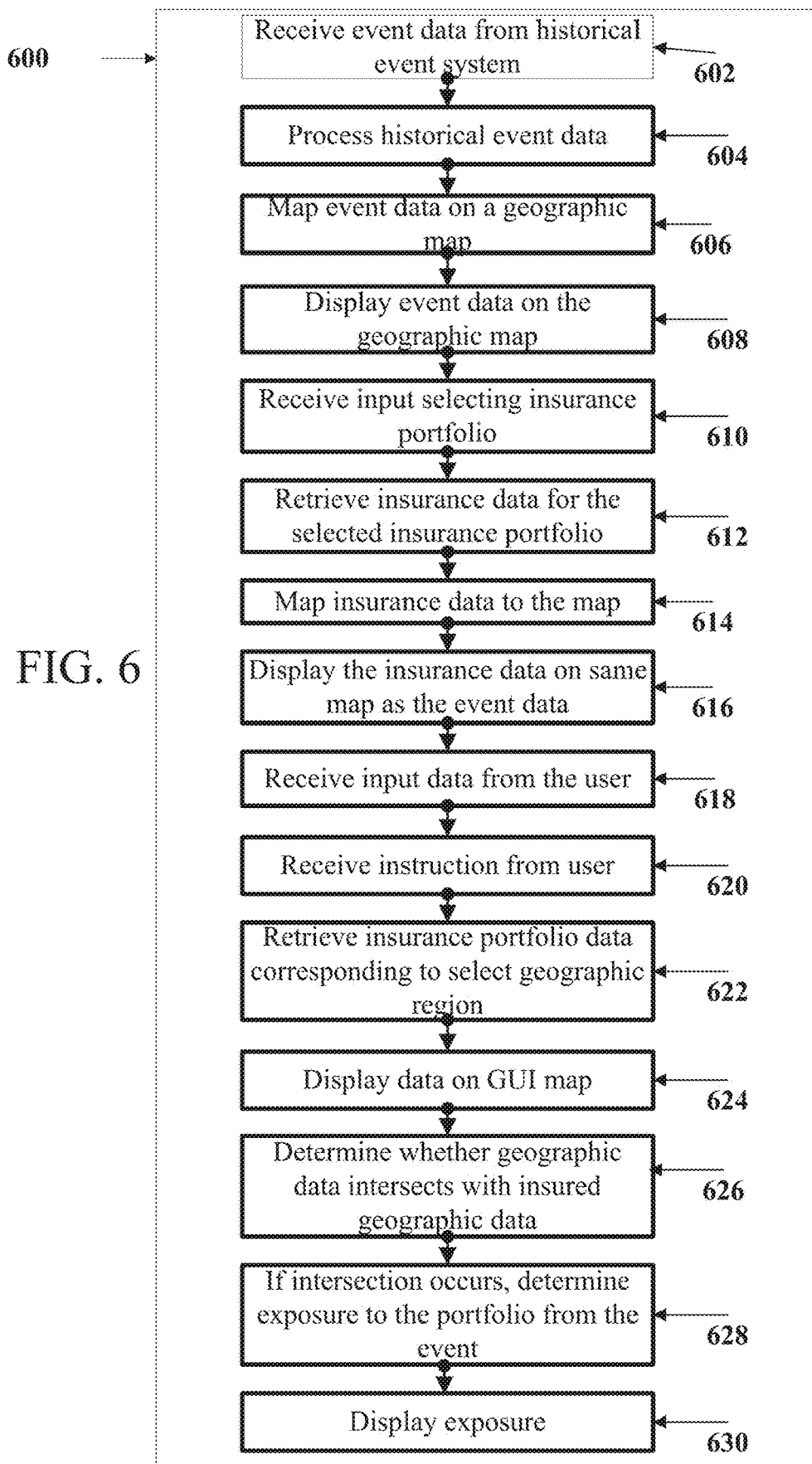
FIG. 6 is a preferred embodiment of an algorithm for the client system showing the mapping of historical event data and insured data for correlation and evaluation.

The client system processor 402 is programmed with an algorithm 600 shown in FIG. 6 to assess the potential risk to an insurance portfolio from an event, which in this embodiment is a historical event. At step 602, the client processor 402 receives event data from the historical event system 200 comprising event type, event severity, and event geographic location. Where the historical system is incorporated into the client system 400, the client processor retrieves the historical data from memory. At step 604, the client system 400 processes the historical event data to map the event data to a map that has been stored in memory. At step 606, the client system maps the event data on a geographic map stored in memory and at step 608 displays the event on a map on the GUI display preferably with an icon indicative of the event type and severity, as shown in the preferred embodiment of FIG. 7. Different colors can be used to indicate the event severity, as shown for example in FIG. 7, where an icon 701 is used to indicate a hurricane, and different colors 702, 703, 704 are used to indicate the severity of the hurricane windfields. Also different shapes 706, 708, 710, can be used to describe the geographic region of the hurricane windfields. The use of a hurricane event is illustrative, and other events can be displayed as described herein. The event path 714 can be shown with colored circles 716 or other icons indicating the level of severity along the event path 714, with the color corresponding to a severity level.

At step 610, the processor can receive input selecting an insurance portfolio from any of various computer input mechanisms, such as a mouse or key board. At step 612, the processor can retrieve the insurance data for the selected insurance portfolio. In the embodiment, where the client system 400 stores the insured data, the processor 402 retrieves the stored insured data from memory. In embodiments where the insured data is stored at a remote computer, the processor 402 interfaces with transceiver 406 to communicate with the insured data system (e.g., 300) to obtain the insured data. At step 614, the processor can map the insurance data to the map, and at step 616, the processor can display the insurance data on the same map with the event data, as shown for example in FIG. 8 (which shows the event data with the event icon from FIG. 7 removed but the event path displayed; the event icon can also be displayed). Preferably, the processor displays the insurance data that pertains to the portfolio by geographic region such as by state 802, county 804, and/or zip code 806. Each geographic region can be color coded with a color that indicates the exposure amount or the risk from the event to the insurance portfolio in that geographic region. Optionally, at step 618, the processor can receive input data from the user as to whether to display the data by state, county, or zip code. The processor can display insured data in different geographic regions with colors that are indicative of the exposure value in a geographic region, such as a state, county, or zip code. The user can scroll over or select (with a mouse, keyboard, or other input device) a geographic area by state, county, or zip code and the processor 402 can receive a corresponding instruction from the user at step 620. In response to that instruction, the processor 402 can retrieve the insurance portfolio data locally or from the remote insured data system 300 corresponding to the selecting geographic region and display that data on the GUI map with a graphic box 902, as shown in for example FIG. 9. In the embodiment shown, the graphic box displays the geographic region selected (which in this embodiment is the "Plaquemines Parish" or county), the total insured value for that region, and also has buttons for selecting a different geographic area, such as a state or a zip code. Thus, when a user sees an event displayed whose geographic location or path intersects with the geographic coverage area, the user can select the effected geographic areas by region (e.g., country, state, county, zip code, etc. . . . ) to determine the potential exposure to the portfolio from the event.

At step 626, the processor can determine whether the geographic data intersects with the insured geographic data. If there is an intersection, the processor can then determine the exposure to the portfolio from the event at step 628, and at step 630 display the exposure.

In the embodiment described in FIG. 3, the event data is processed before the insured data. However, in other preferred embodiments, the insured data is processed before the event data, or the event and insured data are processed simultaneously. The order of the algorithmic steps is not limiting. In addition, the system can use real-time data in addition to or in place of historical data, in which case the real time data is provided by the real-time system 250.

Figure 7:
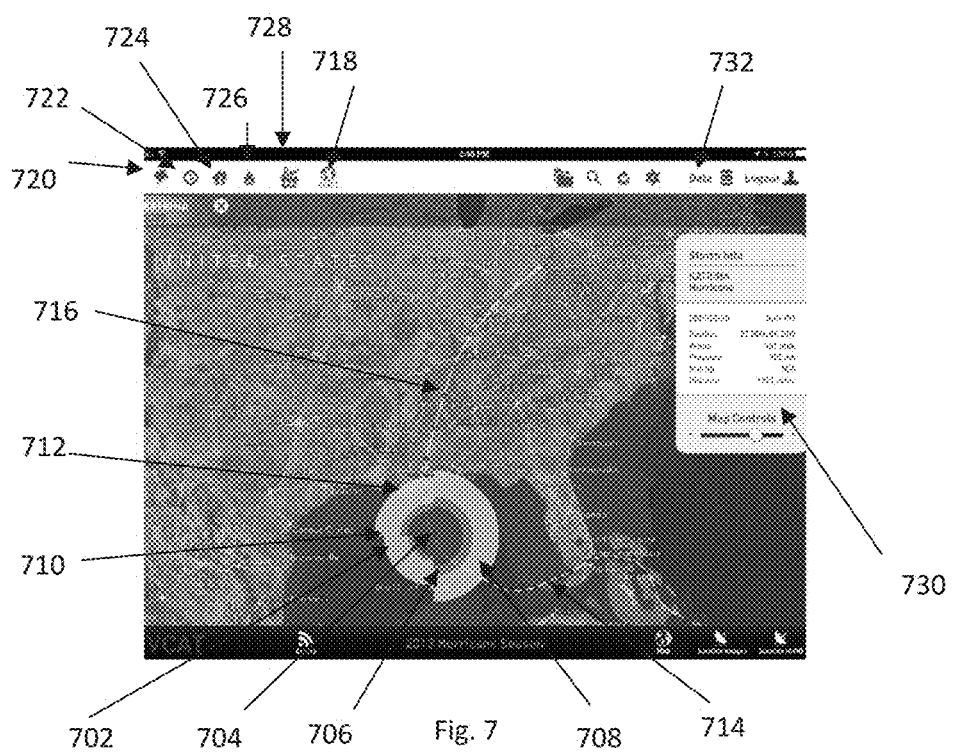
FIG. 7 is a preferred embodiment of event data displayed with the client system.
Figure 10:
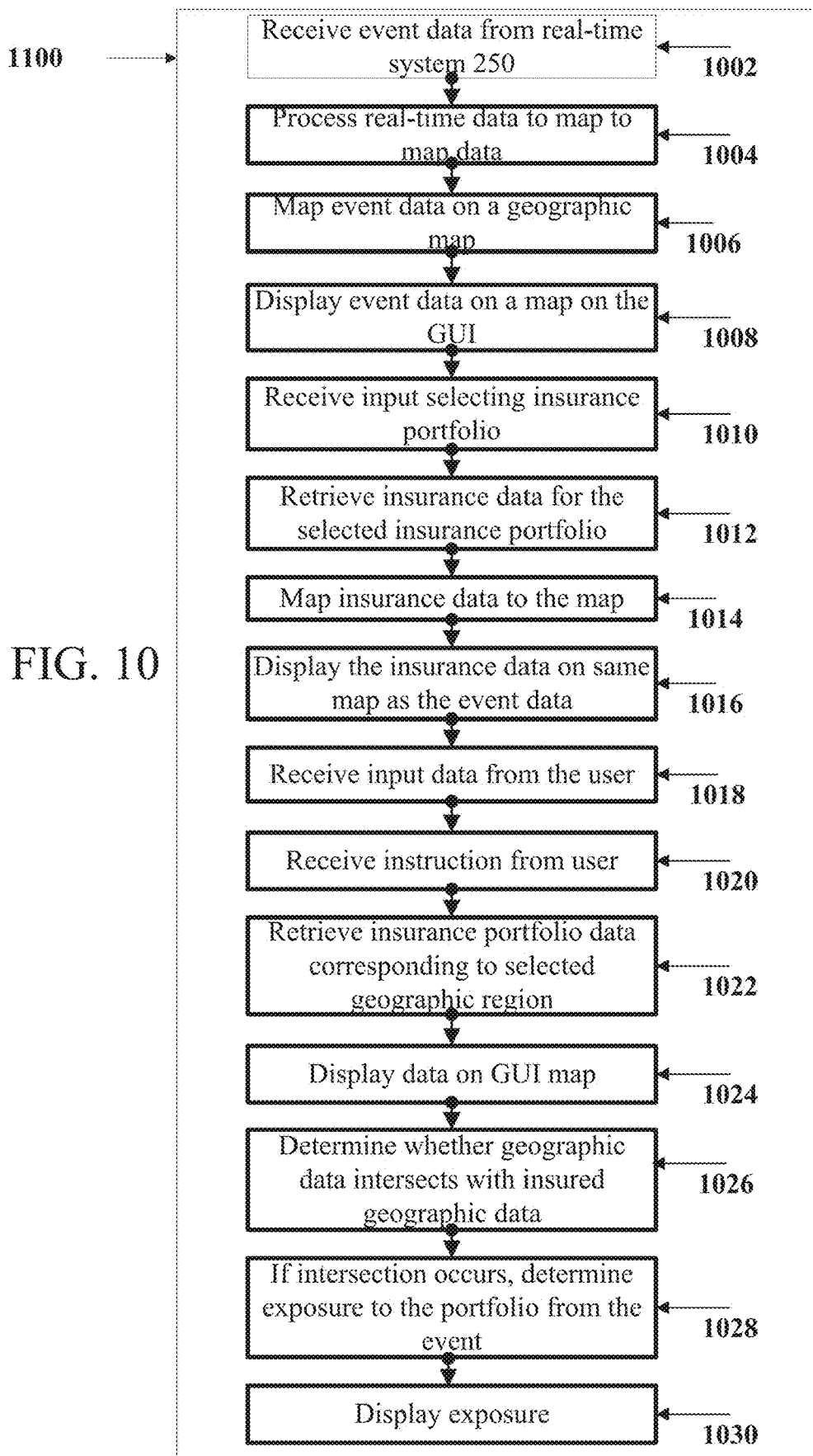
FIG. 10 is a preferred embodiment of an algorithm for the client system showing the mapping of real-time event data and insured data for correlation and evaluation.
Figure 11:
FIG. 11 is a preferred embodiment of a display showing the capability of selecting alerts according to the invention.
Figure 12:
FIG. 12 is a preferred embodiment of an event alert according to the invention.

FIG. 10 depicts the algorithm 1000 for the processor 402 using real-time data to assess the potential risk to an insurance portfolio from an event. In a preferred embodiment, the real-time data is provided by the Global Disaster Alert and Coordination System (GDACS), which is preferably the real-time system 250. Referring to FIG. 7, icon 718 is the GDACS icon (Global Disaster Alert and Coordination system). Other systems may be used to provide the real-time data, and the GDACS system is provided by way of example. Selecting the GDACS icon 718 will permit the selection of turning on or off the disaster alerts, as shown in FIG. 11, which shows a graphic box 1102 that permits the turning off or on of all real-time alerts, on or off of alerts for different events such as tropical storms, earthquakes, and floods, turning on or off alters by alert levels, turning on or off alerts by time spans with buttons corresponding to time spans. As shown in FIG. 12, the processor can upon receiving a GDOCS alert display an alert symbol 34 on the map showing the type of event and further showing a disaster alert menu that provides the user with the capability of obtaining more information on the event. At step 1002, the processor 402 receives event data from the real-time system 250 that comprises event type, event severity, and event geographic location. At step 1004, the client system 400 processes the real-time event data to map the event data to a map. At step 1006, the client system maps the event data on a geographic map stored in memory and at step 1008 displays the event on a map on the GUI preferably with an icon indicative of the event type and severity. Different colors can be used to indicate the event severity. At step 1008, the processor can receive input selecting an insurance portfolio from any of various computer input mechanisms, such as a mouse or key board. At step 1010, the processor can retrieve the insurance data for the selected insurance portfolio. At step 1012, the processor can map the insurance data to the map, and at step 1014, the processor can display the insurance data on the same map as the event data. Preferably, the processor displays the insurance data that pertains to the portfolio by geographic region such as by state, county, and/or zip code, as described above with reference to the historical event data. Optionally, at step 1016, the processor can receive input data from the user as to whether to display the data by state, county, or zip code. The processor can display insured data in different geographic regions with colors that are indicative of the exposure value in a geographic region, such as a state, county, or zip code. Each color represents a different exposure level. The user can scroll over or select a geographic area by state, county, or zip code and the processor can receive a corresponding instruction from the user at step 1018. In response to that instruction, the processor 1020 can retrieve the insurance portfolio data corresponding to the selecting geographic region at step 1022 and display that data on the GUI map at step 1024, as described above with reference to the historical event data. Thus, when a user sees an event displayed whose geographic location or path intersects with the geographic coverage area, the user can select the effected geographic areas by region (e.g., country, state, county, zip code, etc. . . . ) to determine the potential exposure to the portfolio from the event. At step 1026, the processor can determine whether the geographic data intersects with the insured geographic data. If there is an intersection, the processor can then determine the exposure to the portfolio from the event at step 1028, and at step 1030 display the exposure.

In a preferred embodiment for the algorithms of FIGS. 6 and 11, the map is a graphic user interface map as shown in FIG. 7. In other preferred embodiments of the algorithms of FIGS. 3 and 4, satellite imagery can be used. In these embodiments, the processor 402 can be programmed to process satellite image data and the insured and event data can be mapped to the satellite image data and display in the GUI on satellite imagery of a geographic area.

In the embodiment described in FIG. 11, the event data is processed before the insured data. However, in other preferred embodiments, the insured data is processed before the event data, or the event and insured data are processed simultaneously. The order of the algorithmic steps is not limiting.

In preferred embodiments, the event differs. FIG. 7 depicts a preferred embodiment of the graphic user interface.

Figure 13:
FIG. 13 is a preferred embodiment of an event search tool according to this invention.
Figure 14:
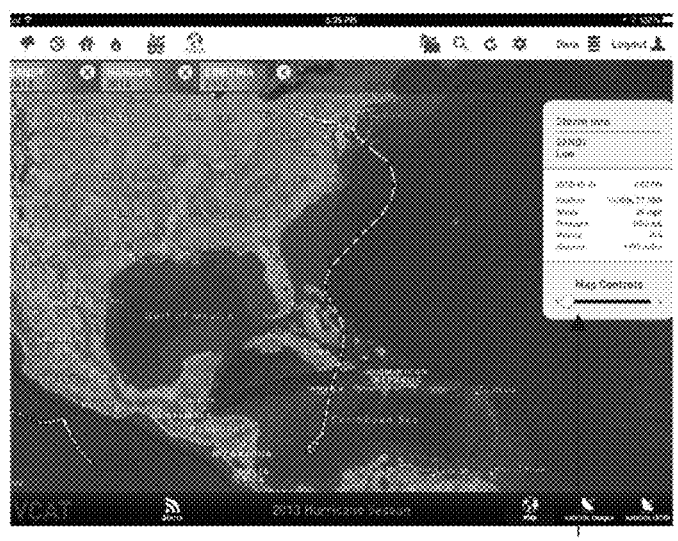
FIG. 14 is a preferred embodiment of the display of storm event data according to this invention.

In a preferred embodiment, there is a GUI icon corresponding to one or more of the event types, as shown in FIG. 7. For example, 720 is an icon corresponding to a storm such a hurricane, 722 is an icon corresponding to a historical storm library, 726 is an earthquake icon, and 726 is a fire icon. Icons for other events such as floods or wind storms can be used as well, and these icons are exemplary for events. In preferred embodiments, the processor is programmed to execute algorithms in response to the selection of the icons. For example, the processor can be programmed as shown in FIG. 6 at step 602 to receive an instruction that one of the event icons 720-726 has been selected. The processor 402 can at step 604 display a graphic search box 1302 on the GUI associated with the particular event type, as shown in FIG. 13. In response to a user input at step 606, the processor can search the memory associated with the particular event type to find the searched for event. For example, in FIG. 13, the search input is "sa" and the storm event was selected, so the storms starting with "sa" are displayed by the processor, including for example hurricane Sandy. In a preferred embodiment, the processor 402 displays the searched for storm type icon, storm name, storm date, and storm description, as shown in FIG. 13. At step 608, the processor 402 can in response to the selection of a particular storm by a user, display that storm on the map as described above with reference to the algorithm in FIG. 6. For example, in FIG. 7, the storm Katrina was selected and the processor 402 displayed that storm in FIG. 7 showing the path and intensity with the various color dots along the path that are indicative of the event severity and an icon showing the location of the event at a particular time. In a preferred embodiment, the processor is programmed to display the storm information at a particular time with a graphic box 1402 as shown in FIG. 14. Preferably, the storm information includes the storm location that corresponds to the icon location, as shown in FIG. 14, and relevant information such as the date, time, latitude and longitude, wind speed, pressure, moving, and distance moved along the path.

Figure 8:
FIG. 8 is a preferred embodiment of event data and insured data displayed with the client system.
Figure 15:
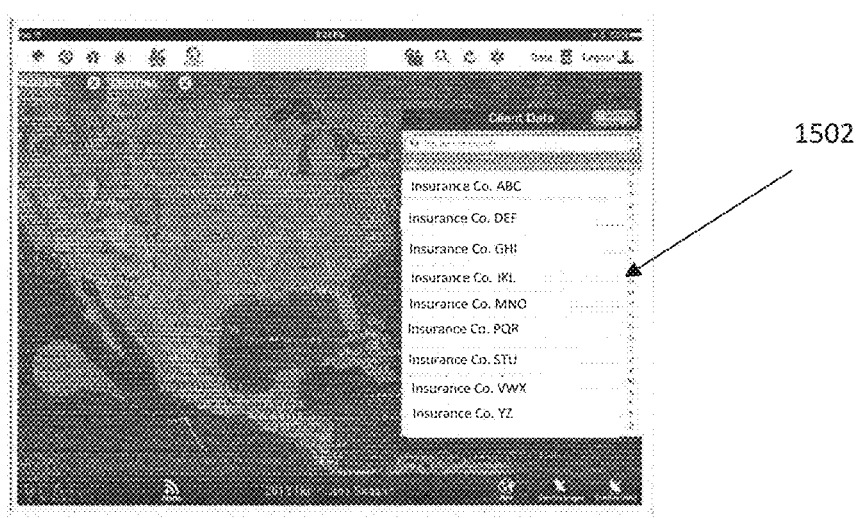
FIG. 15 is a preferred embodiment of the display of insured client data search tool.

In a preferred embodiment, the system 400 can also have a graphic user interface that displays a client data icon 732, as shown in FIG. 7, and programmed with an algorithm 1700 for mapping the insurance data set. At step 1702, the processor 402 can be programmed to receive input that the client data icon has been selected from any conventional computer input mechanism. In response to the selection of the graphic user icon 732, the processor can at step 1704 display a search icon on the graphic box 1502 as shown in FIG. 15 to enable a user to input search criteria for the insured data for a particular insurance portfolio. At step 1706, the processor 402 can receive input that an insured data set has been selected or search for a particular insured data. In the embodiments where the insured data is maintained at a remote computer, the processor 402 sends communications to the remote computer system 300 to search its memory 304 for the insured search criteria. The insured data can be categorized by any technique, and in the preferred embodiment, the insured data is categorized by insurance company. At step 1708, the processor 402 can display the insured data for the selected insurance data set on the graphic user interface map as shown for example in FIG. 7. In this example, the "Louisiana Citizens Prop. Ins Co" particular data set has been selected and shown graphically to have coverage in the states of Arkansas, Georgia, and Louisiana as shown in FIG. 8. Different colors can be used to show the level of coverage. As shown in FIG. 8, the event, the Katrina storm, is shown to implicate the insurance portfolio as the event path crosses the coverage area.

At step 1710, the processor 402 can display a graphic box 808 as shown in FIG. 8 that permits a user to further selected the insurance data set by locations of varying magnification from higher to lower, which in the preferred embodiment are state, county, and zip code. In FIG. 8, the county level has been selected for Louisiana and the counties having coverage associated with the select data set are highlighted with a color, which can be colored according to the exposure value. The event can be viewed as shown in FIG. 8 or 7 to determine whether it implicates a data set in a particular county where there is insurance coverage for that data set.

Figure 9:
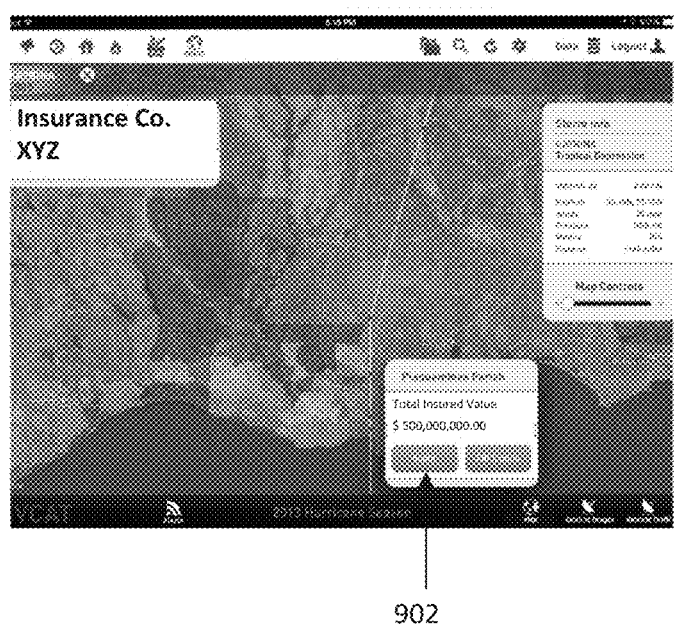
FIG. 9 is a preferred embodiment of the event data and insured data displayed with the client system of this invention.
Figure 17:
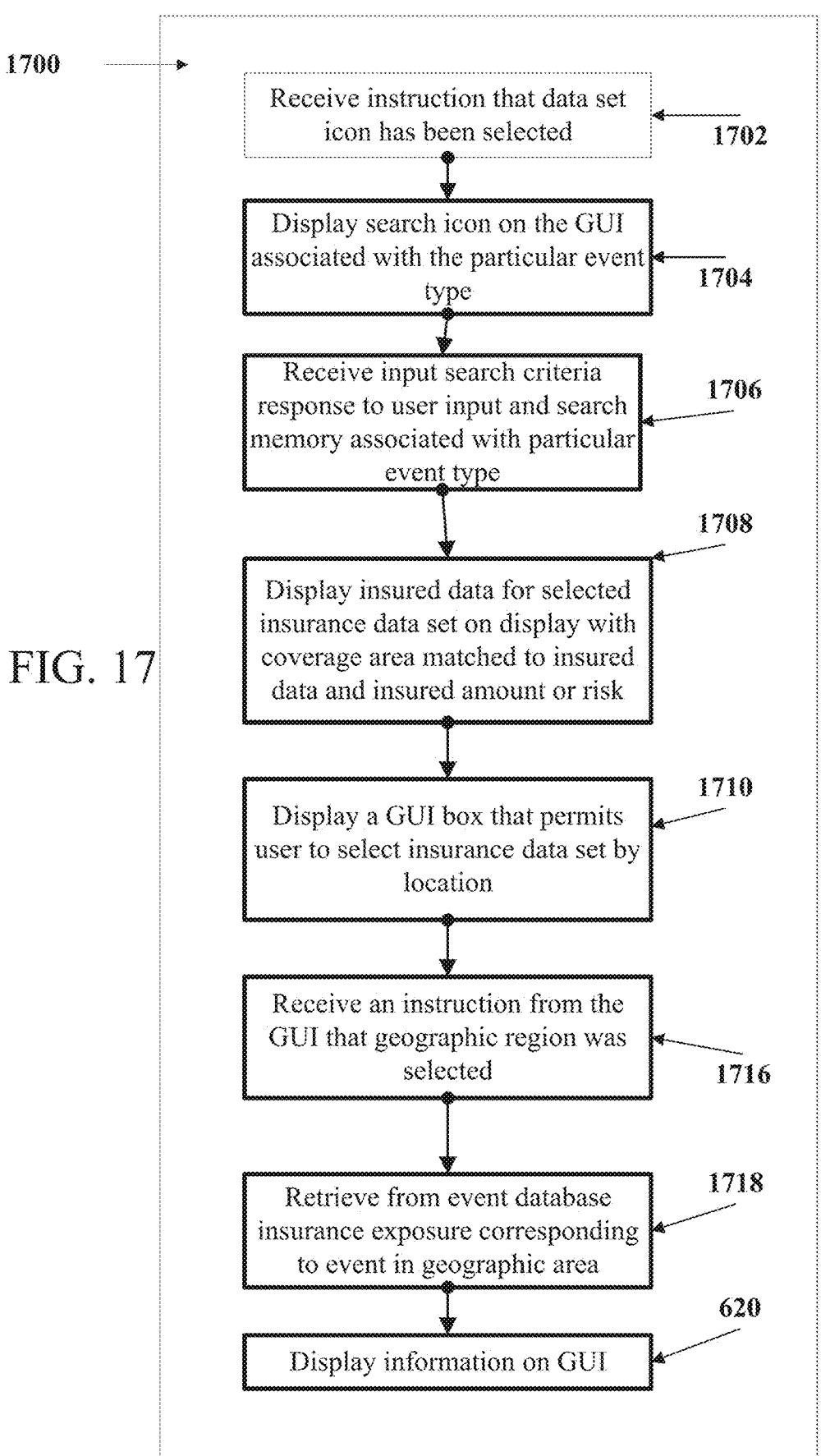
FIG. 17 is a preferred embodiment of an algorithm according to this invention for obtaining insured data for mapping with event data.

In step 1716, the processor can receive an instruction from the graphic user interface that a particular geographic region has been selected. For example, a user can click on a geographic region such as a zip code, county, or state. In response to the instruction, the processor 402 can retrieve from the event data base the insurance exposure corresponding to that event in that geographic area at step 1718. In embodiments where the data is maintained locally, the processor 402 can search its memory 404 for the data. In embodiments where the data is maintained remotely, the processor 402 can execute instructions to communicate with the remote system 300 and obtain the requested insured data. At step 1720, the processor can display that information on the graphic user interface. In the preferred embodiment of FIG. 9, the "Plaquemines Parish" has been selected and the total insured value is displayed. By using this tool, a user can quickly select and determine the insurance coverage in a particular geographic region that is implicated by a particular event. At step 1720, the processor can also display in icon box 902 with the geographic region selected for that insurance data set, the option to vary the magnification for that geographic region, which in this preferred example is by state and zip code because a county has been selected. When a particular geographic region is selected, the processor 402 can display the event information (either historical, actual, or projected) for the particular geographic region. FIG. 9 displays the exposure of the insurance data set when the state region for that insured data set has been selected. This algorithm of FIG. 17 can also be used with those described in reference to FIGS. 6 and 10.

Figure 16:
FIG. 16 is a preferred embodiment of the display of an earthquake event search tool.
Figure 18:
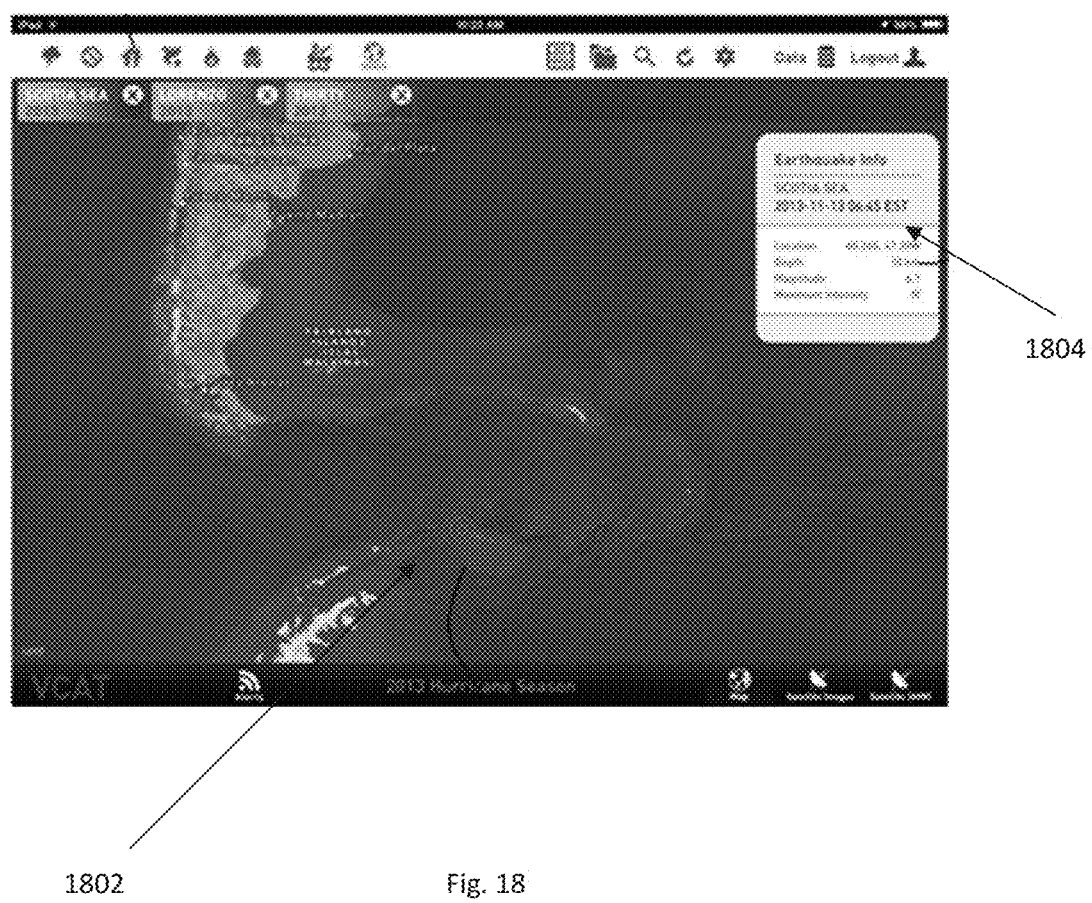
FIG. 18 is a preferred embodiment of a display of earthquake event data.

As described above, the events included herein are not limited and have been and some of the algorithms and interfaces have been described with reference to a hurricane or storm. However, the algorithms and systems described herein can be used with other events, such as fires, tornadoes, floods, and the like. For example, upon selected of the earthquake icon 724 in FIG. 7, the processor 402 can use the algorithms of FIGS. 6 and 10 and retrieve and display a list of earthquake events in an interface icon 1602, as shown in FIG. 16, that are contained in the earthquake event data base, which can be either in the client memory or in a remote system memory, (e.g., system 200). The interface icon can permit conventional searching by name and by level of severity. The interface icon may have buttons that only display earthquake events by level of severity as indicated in FIG. 16. The user can search through the earthquake event list and select an earthquake event with any conventional computer input mechanism. The processor 402 will receive a signal indicating that an earthquake event has been selected, and search the memory, either the local or remote memory, for the selected earthquake event information. Upon obtaining the selected earthquake event information, the processor 402 will display that event on the map indicating the affected area with icons and/or color indicating the level of severity in each affected region, as shown for example in FIG. 18. The circular rings icon shows the affected geographic area, and the rings can be color coded with a color that indicates the level of severity. Further, the processor 402 can retrieve earthquake information and provide that in a graphical box such as 1804 displaying the location, date, time, depth, magnitude, and maximum intensity. Also, the insured data can be mapped to the affected region as described above.

Figure 19:
FIG. 19 is a preferred embodiment of a display of tornado event data.

Likewise, another event example is a tornado event. Similar to described above with reference to earthquakes, the system 400 can have an earthquake icon, which can be selected and the processor 402 can display earthquake events that are selected by a user. For example, FIG. 19 shows a preferred embodiment in which the tornado event 1902 has been selected and a particular tornado, in this case "Oklahoma 2013" has been selected, as shown in the graphical box 1904, and displayed on the graphic user interface. The processor 402 can display the earthquake with varying colors that are indicative of the event severity in a particular geographic region. The algorithms of FIGS. 5, 6, and 8 can be used to display the tornado events and the insured data and to determine whether the earthquake selected implicates an insured data set and the level of exposure. Also, the insured data can be mapped to the affected region as described above.

Figure 20:
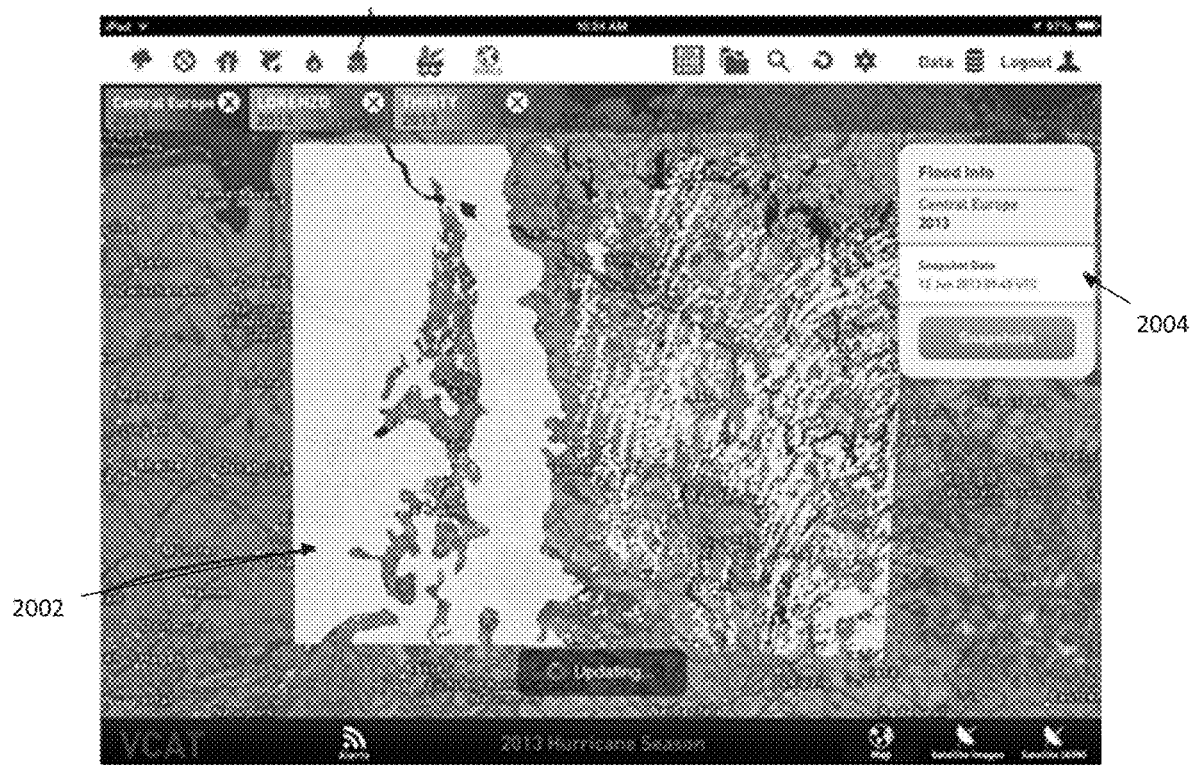
FIG. 20 is a preferred embodiment of flood event data.

Another example of an event is a flood event. Similar to described above with reference to earthquakes, the system 400 can have a flood icon, which can be selected and the processor 402 can display flood events that are selected by a user. FIG. 20 depicts a flood event 2002 that has been are selected in the flood event data base by a user and displayed by the processor 402. FIG. 20 shows a preferred embodiment in which the flood icon has been selected and a particular flood, in this case "Central Europe 2013" has been selected and displayed on the graphic user interface in a graphical box 2004. The processor 402 can display the flood with varying colors that are indicative of the event severity in a particular geographic region. The algorithms of FIGS. 5, 6, and 8 can be used to display the flood events and the insured data and to determine whether the flood selected implicates an insured data set and the level of exposure.

Figure 21:
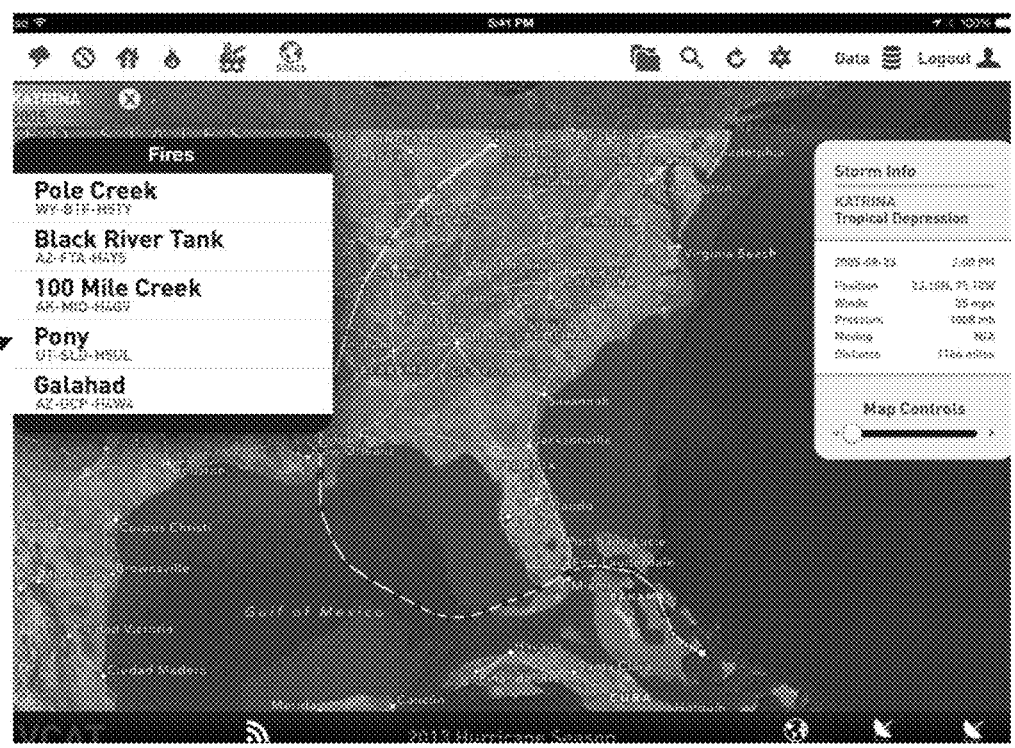
FIG. 21 is a preferred embodiment of a fire event selection tool.
Figure 22:
FIG. 22 is a preferred embodiment of an event search tool.

Another event example is a fire event. Upon selected of the fire icon 726 in FIG. 7, the processor 402 can use the algorithms of FIGS. 6 and 10 and retrieve and display a list of fire events in an interface icon 2102, as shown in FIG. 21, that are contained in the fire event data base, which can be either in the client memory or in a remote system memory, (e.g., system 200). The interface icon can permit conventional searching by name and by level of severity. The interface icon may have buttons that only display fire events by level of severity. The user can search through the fire event list and select a fire event with any conventional computer input mechanism. The processor 402 will receive a signal indicating that a fire event has been selected, and search the memory, either the local or remote memory, for the selected fire event information. Upon obtaining the selected fire event information, the processor 402 will display that event on the map indicating the affected area with icons and/or color indicating the level of severity in each affected region. Further, the processor 402 can retrieve fire event information and provide that in a graphical box such. Also, the insured data can be mapped to the affected region as described above.

Figure 23:
FIG. 23 is a preferred embodiment of the event search tool of FIG. 22.

The systems can also have a historical storm or event library icon, such as icon 722 as shown in FIG. 7. Upon selecting of icon 722, the processor 402 receives a signal that the historical event library has been selected, and retrieves the historical event data from either the local or remote memory in accordance with the algorithms described in FIG. 6. The processor 402 displays a graphical search box 2202 that permits a user to view the events by year (which in this example are storm events, but it could be all events, or just an event subset), with the number of events by year. If a year is selected, the processor 402 receives a signal indicating that a year has been selected, and retrieves from either the local or remote memory the historical storm data for that year, and displays the storm event by year to the user, as shown for example in FIG. 23 at 2302. If a particular storm is selected, the processor will receive a signal indicating that an event has been selected, and query the historical storm memory (either local or remote), and display that storm information on the map, as shown for example in FIG. 7 where hurricane Katrina event was selected. Further as described in FIG. 5, the insured data can also be selected to determine whether the insured data is implicated by the historical storm.

Figure 24:
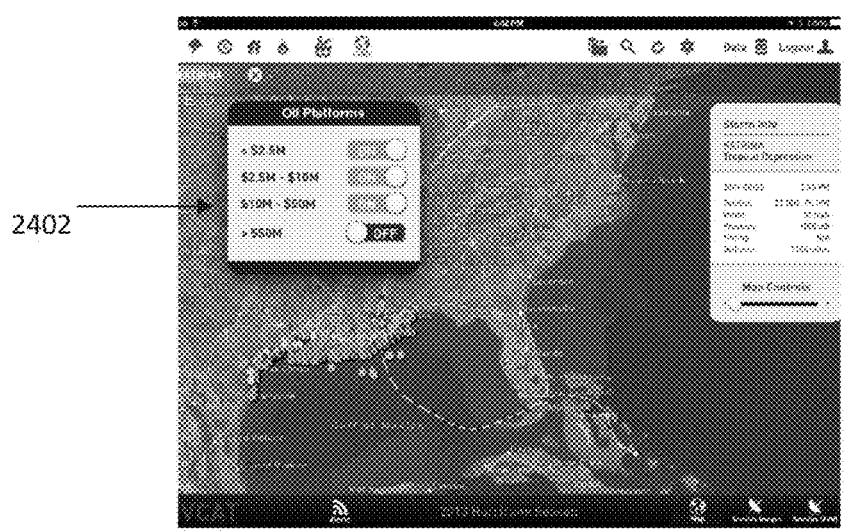
FIG. 24 is a preferred embodiment of a display of insured oil platform data and event data.

Referring to FIG. 7, another icon is the oil platforms icon 728. If the oil platforms icon 728 is selected, the processor 402 can display a menu box 2402 permitting the selection of oil platforms based on their insured value, as shown in for example FIG. 24. For example, the oil platforms menu displays oil platforms depending upon whether their insured value is less than $2.5 million, between $2.5 million and $10 million, between $10 million and/or $50 million or cost greater than that. The particular amounts are not important. The processor 402 can in response to the selection of oil platform values retrieve the geographic location of platforms with that value and display them on the GUI map as shown for example in FIG. 24. The oil platforms can be colored based on insured value with the colors representing a range of insured value. As is also shown in FIG. 7, the processor 402 can display the event data and the oil platform data on the map to determine whether the oil platforms are implicated by the event.

As described above, the processor 402 can map the event and insured data to a map, but instead of a map could also use satellite imagery of the affected area. As shown in FIG. 7, if the satellite image icon 734 is selected, the satellite imagery of the event can be displayed. This satellite images can be historical or real-time. The system can also have a satellite AVN icon 736. AVN stands for aviation model and displays infrared satellite event images, which can be historical or real-time data.

Because computing processes can be moved between computers, it is to be understood that the inventions described herein are not limited to a certain computer or processor, and the inventions can be carried out in one or more computers as described above. It is to be understood, however, that even though numerous characteristics and advantages of the present invention have been set forth in the foregoing description, together with details of the structure and function of the invention, the disclosure is illustrative only, and changes may be made in detail, especially in matters of arrangement of parts, details reflected in the icons, and other display characteristics, within the principles of the invention to the full extent indicated by the broad general meaning of the terms in which the appended claims are expressed.

What is claimed is:

1. An insurance evaluation system for evaluating the exposure to insurance in a geographic area due to an event that includes event data, comprising:
   an electrical receiver configured to receive the event data that comprises event type, event severity, and event geographic area;

a graphical user interface (GUI) display;
a computer memory for storing insured data comprising an insured value for a plurality of insurance instruments and an insured geographic area; and
a computer processor programmed to:
  at least one of:
    automatically perform satellite triangulation, using a satellite transceiver, with a global positioning system (GPS) chipset coupled to the computer processor to determine current location information comprising longitude and latitude of a client device;
    automatically establish a communication channel with an over an air interface from a cellular base station to obtain the current location information for the client device; or
    automatically establish a communication channel with a first base station and a second base station, receive a first signal from the first base station, receive a second signal from the second base station, determine a timing of the first signal and the second signal and then determine the current location information based on the first signal and the second signal;
  receive, by the computer processor, input about the event type;
  automatically acquire, by the computer processor, the event data about the event from a streaming service that provides the event data associated with the current location information in real time, wherein the event data comprises the event type, event name, event severity, and event geographic area;
  provide, by the computer processor, real-time disaster alert icons on the GUI display for user input, based on the event type, alert level and time span relating to the event;
  receive, by the computer processor, from the GUI display the software-enabled selection for the real-time disaster alert icons for the time span relating to the event;
  automatically acquire, by the computer processor and from at least one of a vibration device or an accelerometer located in the event geographic area, the event data about the event that includes vibration data of vibrations occurring in the event geographic area that are caused by the event;
  evaluate, by the computer processor, an event path of the event type within the event geographic area for the event based on the event data including the vibration data;
  display, by the computer processor, the event data and a map of the event path geographically on the GUI display;
  provide, by the computer processor, a software-enabled selection of a satellite icon on the GUI display for the user input for displaying at least one of real-time or historical satellite imagery of the event path;
  receive, by the computer processor, from the GUI display the software-enabled selection for the satellite icon;
  automatically switch, by the computer processor, the GUI display of the map of the event path to at least one of real-time or historical satellite imagery of the event path;
  automatically acquire, by the computer processor, the insured data comprising the insured value for the plurality of insurance instruments and an insured geographic area of the plurality of insurance instruments;
  display, by the computer processor, the insured data comprising the insured value for the plurality of insurance instruments geographically showing the insured geographic area on the GUI display;
  compare, by the computer processor, geographic coordinates of the event path and the event geographic area with the insured geographic area;
  determine, by the computer processor, that the geographic coordinates of the insured geographic area intersects with the event path and the event geographic area;
  determine, by the computer processor, that the insured geographic area is impacted by the event path and the event geographic area based on the intersecting of the geographic coordinates;
  determine, by the computer processor, an exposure to the insured data based on the event severity along the event path, the event path, the event geographic area, the insured geographic area, an insured risk and the insured value; and
  display, by the computer processor, the exposure to the insured data geographically on the GUI display.

2. The system of claim 1, wherein the event geographic area includes a geographic area of at least one of an event location, event path or a projected path of the event.

3. The system of claim 1, wherein the event data is historical event data.

4. The system of claim 1, wherein the event geographic area is obtained at least one of while the event is happening or when the event is about to happen.

5. The system of claim 1, wherein the insured data further comprises an insurance company associated with each of the plurality of insurance instruments.

6. The system of claim 1, wherein the event geographic area includes an event path shown with colored circles on the GUI display.

7. The system of claim 1, wherein the display of the exposure includes displaying different colors for different exposure risks.

8. The system of claim 1, wherein the computer processor is further programmed to:
  receive a user selected custom region, wherein the region is at least one of a country, state, province, county, or zip code; and
  determine that the insured geographic area in the region is impacted by the event geographic area in the region based on the intersecting of the geographic coordinates within the region.

9. The system of claim 1, wherein the computer processor is further programmed to receive input to at least one of provide the real-time disaster alert icons or request more information about the event.

10. The system of claim 1, wherein the computer processor is further programmed to display a graphic search box associated with the event type.

11. The system of claim 1, wherein the computer processor is further programmed to receive input requesting the event name and display the event data associated with the event name.

12. A method comprising:
  at least one of:
    automatically performing satellite triangulation, using a satellite transceiver, with a global positioning system (GPS) chipset coupled to the computer processor to determine current location information comprising longitude and latitude of a client device;
automatically establishing a communication channel with an over an air interface from a cellular base station to obtain the current location information for the client device; or
automatically establishing a communication channel with a first base station and a second base station, receive a first signal from the first base station, receive a second signal from the second base station, determine a timing of the first signal and the second signal and then determine the current location information based on the first signal and the second signal;
receiving, by the computer processor, input about an event type for an event;
automatically acquiring, by the computer processor, event data about the event from a streaming service that provides the event data associated with the current location information in real time, wherein the event data comprises the event type, event name, event severity, and event geographic area;
providing, by the computer processor, real-time disaster alert icons on the GUI display for user input, based on the event type, alert level and time span relating to the event;
receiving, by the computer processor, from the GUI display the software-enabled selection for the real-time disaster alert icons for the time span relating to the event;
automatically acquiring, by the computer processor and from at least one of a vibration device or an accelerometer located in the event geographic area, the event data about the event that includes vibration data of vibrations occurring in the event geographic area that are caused by the event;
evaluating, by the computer processor, an event path of the event type within the event geographic area for the event based on the event data including the vibration data;
displaying, by the computer processor, the event data and a map of the event path geographically on the GUI display;
providing, by the computer processor, a software-enabled selection of a satellite icon on the GUI display for the user input for displaying at least one of real-time or historical satellite imagery of the event path;
receiving, by the computer processor, from the GUI display the software-enabled selection for the satellite icon;
automatically switching, by the computer processor, the GUI display of the map of the event path to at least one of real-time or historical satellite imagery of the event path;
automatically acquiring, by the computer processor, the insured data comprising the insured value for the plurality of insurance instruments and an insured geographic area of the plurality of insurance instruments;
displaying, by the computer processor, the insured data comprising the insured value for the plurality of insurance instruments geographically showing the insured geographic area on the GUI display;
comparing, by the computer processor, geographic coordinates of the event path and the event geographic area with the insured geographic area;
determining, by the computer processor, that the geographic coordinates of the insured geographic area intersects with the event path and the event geographic area;
determining, by the computer processor, that the insured geographic area is impacted by the event path and the event geographic area based on the intersecting of the geographic coordinates;
determining, by the computer processor, an exposure to the insured data based on the event severity along the event path, the event path, the event geographic area, the insured geographic area, an insured risk and the insured value; and
displaying, by the computer processor, the exposure to the insured data geographically on the GUI display.

* * * * *

UNITED STATES PATENT AND TRADEMARK OFFICE
CERTIFICATE OF CORRECTION

| | | |
|---|---|---|
| PATENT NO. | : 11,062,393 B2 | Page 1 of 1 |
| APPLICATION NO. | : 14/456311 | |
| DATED | : July 13, 2021 | |
| INVENTOR(S) | : Jonathan Ritz | |

It is certified that error appears in the above-identified patent and that said Letters Patent is hereby corrected as shown below:

On the Title Page

Item (54) and in the Specification at Column 1, Lines 1-3 in the title please delete the word "CATOSTROPHIC" and replace with --CATASTROPHIC--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*